3,471,544
PHOSPHONIUM ZWITTERION

Donald A. Tomalia, Midland, Mich., assignor to The Dow Chemical Company, Midland, Mich., a corporation of Delaware
No Drawing. Filed Dec. 22, 1966, Ser. No. 603,763
Int. Cl. C07c *141/00;* A01n *9/36*
U.S. Cl. 260—457         5 Claims

---

ABSTRACT OF THE DISCLOSURE

The present invention is directed to a phosphonium zwitterion of the formula

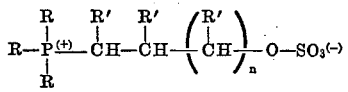

wherein each R independently represents loweralkyl or phenyl; each R' independently represents hydrogen, methyl, ethyl, n-propyl, isopropyl, n-butyl, or phenyl; and $n$ represents an integer of from 0 to 1, both inclusive. The products of this invention are useful as agents to control the growth of plants.

---

DETAILED DESCRIPTION OF THE INVENTION

The products of the present invention typically are crystalline solid substances. They are prepared by the reaction of a trihydrocarbylphosphine compound of the formula

with a cyclic sulfate of the formula

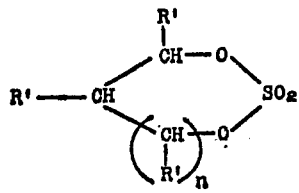

The reaction is conveniently and preferably carried out in an inert liquid reaction medium, typically an organic liquid. Suitable such liquids include hydrocarbons, such as hexane, benzene, and toluene; and chlorinated hydrocarbons, such as methylene chloride and chlorobenzene. The reaction goes forward at temperatures over a wide range, such as from 25 to 150° C. Conveniently, where the boiling temperature of the organic liquid employed as reaction medium is in the preferred temperature range, the reaction is conducted at reflux. The amounts of the reactants employed are not critical, some of the desired product being obtained when employing any amounts. However, the reaction consumes the reactants in amounts representing equimolecular proportions, and the use of such amounts is preferred.

In carrying out the reaction, the reactants are contacted with one another, conveniently by adding one reactant to the other in inert liquid reaction medium. The reaction goes forward readily with the preparation of the desired product in the reaction medium. There is no byproduct. Sometimes it is preferred to maintain the product-containing reaction mixture in the reaction temperature range following completion of the contacting of the reactants to insure completion of the reaction. The desired product is separated from the reaction mixture in conventional procedures; most typically, the reaction mixture is filtered to separate the product. Ordinarily the separated product is relatively pure, but when desired, the product can be further purified in conventional procedures, most typically, recrystallization.

The following examples illustrate the best mode now known for the practice of the present invention and will enable those skilled in the art to practice the same.

Example 1.—(2-hydroxyethyl)triphenylphosphonium sulfate zwitterion

Triphenylphosphine (5.25 grams; 0.02 mole) and 1,3,2-dioxathiolane 2,2-dioxide (2.48 grams; 0.02 mole) were mixed together in 25 milliliters of dry methylene chloride. The resulting homogeneous reaction mixture was refluxed for a period of 4 to 5 hours, during which period a crystalline material began to precipitate in the reaction mixture. The reaction mixture was cooled in an ice bath and then filtered to separate the crystalline material, the expected (2-hydroxyethyl)triphenylphosphonium sulfate zwitterion product. The product melted at 215–217° C. A nuclear magnetic resonance spectrum ($D_6$–DMSO) consisited of a multiple centered at −7.78 p.p.m., indicating aromatic protons, and a broad multiplet centered at −4.06 p.p.m., indicating presence of —$CH_2$-groups. The proton integration was consistent with the proposed product and was found to be in the ratio of 15:4 (aromatic:aliphatic protons).

Other representative products of the present invention include the following, prepared in accordance with the foregoing teachings and example:

Examples 2–10

From trimethylphosphine and 1,3,2-dioxathiolane-2,2-dioxide, (2-hydroxyethyl)trimethylphosphonium sulfate zwitterion, M.W. of 200.2.

From triphenylphosphine and 1,3,2-dioxathiane-2,2-dioxide, (3-hydroxy-n-propyl)triphenylphosphonium sulfate zwitterion, M.W. of 400.4.

From trimethylphosphine and 4,5 - dimethyl-1,3,2-dioxathiolane - 2,2-dioxide, (2-hydroxy-1-methyl-n-propyl)trimethylphosphonium sulfate zwitterion, M.W. of 228.3.

From tri-n-butylphosphine and 1,3,2-dioxathiane-2,2-dioxide, (3 - hydroxy-n-propyl)tri-n-butylphosphonium sulfate zwitterion, M.W. of 340.5.

From triethylphosphine and 4,5-diphenyl-1,3,2-dioxathiolane - 2,2-dioxide, (2-hydroxy-1,2-diphenylethyl)-triethylphosphonium sulfate zwitterion, M.W. of 394.5.

From dimethylphenylphosphine and 1,3,2-dioxathiane-2,2 - dioxide, (3-hydroxy-n-propyl)dimethylphenylphosphonium sulfate zwitterion, M.W. of 276.3.

From triisopropylphosphine and 4-ethyl-1,3,2-dioxathiolane - 2,2-dioxide, (2-hydroxy-n-butyl)triisopropylphosphonium sulfate zwitterion, M.W. of 312.4.

From n-butyl-di-n-propylphosphine and 4,6-dimethyl-1,3,2 - dioxathiane-2,2-dioxide, (3-hydroxy-1-methyl-n-butyl)-n-butyl-di-n-propylphosphonium sulfate zwitterion, M.W. of 340.5.

From n-butyldiphenylphosphine and 5-ethyl-4-isopropyl-1,3,2-dioxathiane-2,2-dioxide, (3-hydroxy-2-ethyl-4 - methyl-n-pentyl)-n-butyldiphenylphosphonium sulfate zwitterion, M.W. of 450.6.

The products of the present invention are useful as toxicants to control the growth of plants, including higher plants as well as bacteria and fungi. When a product is so employed, the unmodified substance can be utilized. However, the present invention also encompasses the utilization of the substance together with an adjuvant. For example, the substance can be dispersed on a finely divided solid and the resulting preparation employed as a dust. Also, a product of the present invention, or a composition comprising the same and a finely divided solid, can be dispersed in water with the aid of a wetting agent and the resulting aqueous suspension employed as a spray. In other procedures, a product according to the present invention can be employed as the constituent of organic liquid compositions, oil-in-water or water-in-oil emulsions, or water dispersions, with or without the addition of a wetting, dispersing, or emulsifying agent.

In representative operations, a bacteriological culture medium containing 0.05 percent, by weight of (2-hydroxyethyl)triphenylphosphonium sulfate zwitterion gave complete inhibition of the growth of *Staphylococcus aureus, Bacillus subtilis,* and *Pullularia pullulans.*

I claim:
1. Compound of the formula

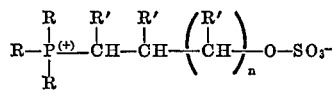

wherein each R independently represents loweralkyl or phenyl; each R' independently represents hydrogen, methyl, ethyl, n-propyl, isopropyl, n-butyl, or phenyl; and $n$ represents as integer of from 0 to 1, both inclusive.

2. The compound of claim 1 wherein $n$ represents 1.
3. The compound of claim 1 wherein $n$ represents 0.
4. The compound of claim 3 wherein each R represents phenyl and each R' represents hydrogen.
5. The compound of claim 3 wherein each R represents methyl and each R' represents hydrogen.

References Cited

UNITED STATES PATENTS

| | | |
|---|---|---|
| 2,369,443 | 2/1945 | Dickey et al. |
| 3,409,707 | 11/1968 | Grayson et al. |

DANIEL D. HORWITZ, Primary Examiner

U.S. Cl. X.R.

424—198, 303; 260—458